United States Patent [19]

Vignoli

[11] Patent Number: 5,490,552

[45] Date of Patent: Feb. 13, 1996

[54] PNEUMATICALLY OPERATED TYRE REMOVAL MACHINE

[76] Inventor: Giuliano Vignoli, 144, Via Scaglia Est, I - 41100 Modena, Italy

[21] Appl. No.: 295,438

[22] Filed: Aug. 25, 1994

[30] Foreign Application Priority Data

Sep. 9, 1993 [IT] Italy .................. RE93A0065

[51] Int. Cl.⁶ .................................. B60C 25/06
[52] U.S. Cl. .................................. 157/1.24
[58] Field of Search ................... 157/1.1, 1.17, 157/1.2, 1.22, 1.24, 1.26, 1.28

[56] References Cited

U.S. PATENT DOCUMENTS 3,212,552  10/1965  Foster .
4,209,053   6/1980  du Quesne .
5,050,659   9/1991  Scalambra .................. 157/1.24

FOREIGN PATENT DOCUMENTS 2730815  1/1978  Germany .
 479414 11/1969  Switzerland .

*Primary Examiner*—D. S. Meislin
*Attorney, Agent, or Firm*—Birch, Stewart, Kolasch & Birch

[57] ABSTRACT

The tyre removal machine comprises a frame (1) which contains a rotatable vertical shaft (6) carrying a self-centering unit (2), and is provided with a rear column (3) for supporting a tyre mounting/removal tool (10), and a rotatable arm (13) for supporting a bead release tool (12), and further comprises at least one flexible element (35) which at one end is connected to the rod (112) of a double-acting pneumatic cylinder-piston unit (11), its other end forking into two branches (130, 131) which wind in opposing directions about two coaxial pulleys (30, 31) which are idly mounted on the shaft (6) and with which there are associated respective coupling devices for making them selectively rigid with this latter, and a mechanism (34) to cause them to rotate in order to rewind the branches (130, 131).

18 Claims, 3 Drawing Sheets

PNEUMATICALLY OPERATED TYRE REMOVAL MACHINE

BACKGROUND OF THE INVENTION

This invention relates generally to a tyre removal machine, and more particularly to a pneumatically operated tyre removal machine.

With particular but not exclusive reference to wheels (wheel rim+tyre) for light motor vehicles, such as automobiles and vans, and motorcycles, tyre removal machines are known comprising basically a frame on which there are mounted a self-centering unit of vertical axis for locking the wheel rims, and a rearward column which supports, in a manner enabling it to be adjusted in both a vertical and horizontal direction, a tool for mounting and removing tyres onto and from the respective wheel rims.

In such known tyre removal machines the self-centering unit is rotated by a step-down gear coupled to the vertical shaft supporting said self-centering unit, and driven by an electric motor by way of a belt transmission.

In addition, these tyre removal machines are usually provided with a lateral arm which at one end is hinged to one side of the frame on a rear vertical axis, and at its other end supports a bead release tool.

Between said frame and said arm there is interposed a single-acting cylinder-piston unit which is coupled to the arm with unilateral engagement, the bead release tool being able to rotate by virtue of said arm, between a rest position in which it is spaced from the corresponding side of the frame, and a working position in which it makes contact with the bead of a wheel (wheel rim+tyre) resting in an upright position against said side.

In these described tyre removal machines, during the mounting and removal of a tyre the self-centering unit is rotated at constant speed by said geared motor unit, both if the tyre beads are easy to mount on and withdraw from the respective bead stop edges of the wheel rim and if this mounting and withdrawal require considerable force.

However the combination of this considerable force and the rotational speed of the self-centering unit, which as stated does not change when the resistance offered by the bead varies, means that the bead is subjected to a sharp sudden action which can result in, and indeed has resulted in, inconvenient damage to the bead, such as stretching and cracking.

In addition, with the aforedescribed tyre removal machines the tyres can also suffer damage during bead release.

This is particularly so if the bead strongly adheres to the bead stop edge and to its containing seat, and/or if this latter is provided on the side opposite the bead stop edge with a circumferential rib to prevent bead release if the tyre should become deflated while the respective vehicle is running.

In this respect, in such situations the bead offers particularly high resistance to detachment, with the result that the air fed into the operating chamber of the single-acting pneumatic cylinder-piston unit controlling the bead release tool is compressed to an increasing extent, and when said bead becomes detached said air behaves as a compressed spring undergoing instantaneous release.

Consequently the bead is forcibly urged towards the frame of the tyre removal machine, and undergoes bending and compression which can damage it, as has already happened.

SUMMARY OF THE INVENTION

The main object of the present invention is to provide a tyre removal machine able to obviate the aforegoing within the context of a simple and rational construction.

Said object is attained according to the invention in that the self-centering unit and possibly the arm supporting the bead release tool are operated by a pneumatic device.

In particular, said pneumatic device consists of a double-acting pneumatic cylinder-piston unit preferably located external to the frame in a protected position.

For example the cylinder-piston unit is positioned close to the column supporting the tyre mounting and removal tool, and more preferably within it.

To the rod of said cylinder-piston unit there is connected the end of a flexible element such as a metal cable, the other end of which forks into two branches which wind in opposing directions about respective idle pulleys mounted on the vertical shaft supporting the self-centering unit.

In addition, with each individual pulley there is associated a coupling device, for example in the form of a frontal clutch, which is arranged to make the pulley rigid with the vertical shaft, so that this latter can be made to rotate by the cylinder-piston unit by way of said cable.

More specifically, during the outward stroke of the cylinder-piston unit, said two pulleys are rotated in opposing directions by the respective branches of said flexible element, said pulleys being provided with means which rewind said two branches during the return stroke of the cylinder-piston unit.

For example said means can consist of one or more torsion springs.

On the support shaft for the self-centering unit there is provided a third pulley about which there winds a further flexible element, such as a cable, which extends outwards from the frame to connect to the arm supporting the bead release tool.

Said third pulley is preferably rigid with one of the aforesaid pulleys.

Finally, the self-centering plate is mounted at the top of its vertical support shaft in a height-adjustable manner.

All the objects of the invention are attained by means of the aforesaid means.

In this respect, by using said double-acting pneumatic cylinder-piston unit the operations involved in the bead release and the mounting/removal of a tyre are always effected in a particularly smooth and delicate manner, with consequent safeguard to the soundness of the tyre.

More specifically, during tyre mounting and removal, the rotational speed of the self-centering unit varies in a manner inversely proportional to the resistance offered by the bead during its insertion/extraction. This means that the self-centering unit slows down when resistance increases, while at the same time the pressure within the operating chamber of the cylinder-piston unit being fed with compressed air increases, whereas the said self-centering unit accelerates when the resistance decreases, due to the fact that the pressure within said operating chamber adapts to the new situation.

Obviously said acceleration enables the time lost during the preceding slow-down to be substantially recovered.

Consequently because of said speed variation, tyre mounting and removal are effected smoothly and gradually even if the tyre is difficult to insert or extract, and likewise the speed increase of the self-centering unit after overcoming a particularly high resistance is also smooth and gradual.

This is because the outward travel of the cylinder-piston unit is braked by the air present in that chamber of the cylinder-piston unit which at that moment is discharging.

At this point it is apparent that said braking action also occurs during the release of beads which are particularly difficult to detach, so that their release is effected gradually, with simultaneous elimination of the problems stated in the introduction.

In addition the use of said double-acting pneumatic cylinder-piston unit for operating both the self-centering unit and the bead release tool is advantageous for the following reasons.

Firstly, the installation of a tyre removal machine according to the invention is extremely simple and comfortable in that it merely requires connection to a compressed air source, whereas in the known tyre removal machines described in the introduction a connection to a source of electricity is also required, which can be problematic if this latter is of a different voltage and/or frequency than those required for the tyre removal machine.

Secondly the absence of electric current makes the invention safer.

Thirdly the means according to the invention and their particular arrangement enable a low-height frame to be achieved, this enabling the self-centering unit to be height-adjusted as stated heretofore.

Because of this, the operator can operate comfortably on wheels of even considerably different widths.

In addition, according to the invention the support shaft for the self-centering unit and the relative accessories such as the coupling devices form a group which can be extracted from and inserted into the frame from above, so as to simplify assembly, inspection, maintenance and repair operations.

In addition to this, and as will be apparent hereinafter, said group is mounted in such a manner as to be particularly rigid and robust, so that the self-centering unit is maintained in a perfectly horizontal position even when subjected to particularly high force.

Finally, the tyre removal machine of the invention is constructionally simple, and is hence also particularly reliable and of easy maintenance, and can be manufactured at low cost.

The characteristics and constructional merits of the invention and its operation will be apparent from the detailed description given hereinafter with reference to the accompanying figures, which illustrate a preferred embodiment thereof by way of non-limiting example.

DESCRIPTION OF THE PREFERRED EMBODIMENTS

Figure 1:
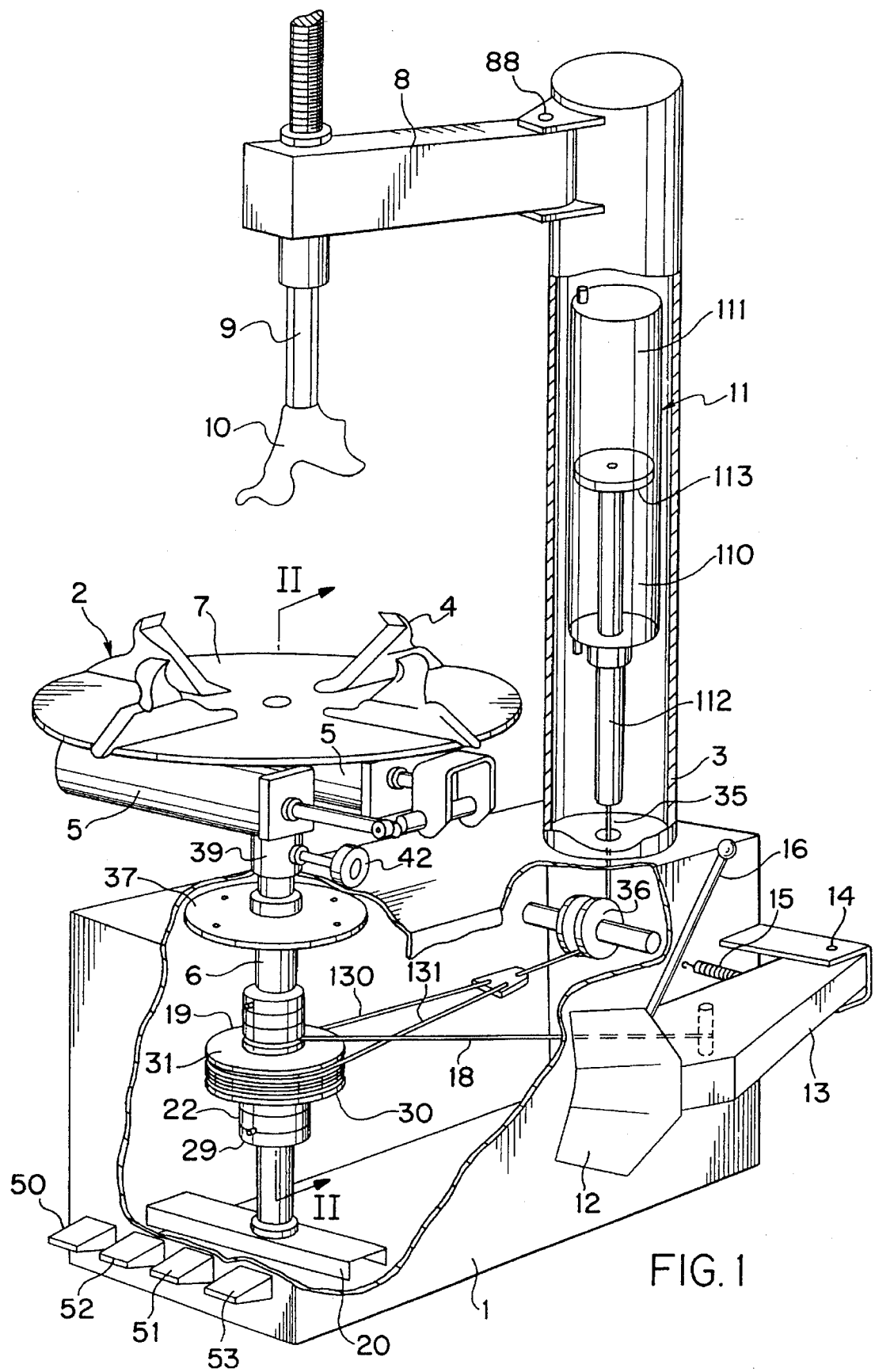
FIG. 1 is a perspective view of the invention with parts cut away to show parts which would otherwise be hidden.

The Figures, and in particular FIG. 1, show a frame 1 of parallelepiped shape on which there are positioned a self-centering unit 2 of vertical axis and a rearward hollow cylindrical column 3.

The self-centering unit 2 comprises four heads 4, commonly known as jaws, designed to grip the rim of a wheel, this latter not being shown for clarity and simplicity.

The heads 4 are made to slide radially by a pair of underlying pneumatic cylinder-piston units 5, by way of means which it is not necessary to describe in detail.

A convenient pedal 50 is provided on the front of the frame 1 for controlling said cylinder-piston units 5.

The self-centering unit 2 is positioned at the top of a vertical shaft 6 which can be rotated in the two opposing directions as described hereinafter.

With regard to said column 3, to its top there is hinged on a vertical axis 88 a horizontal arm 8, the free end of which supports a vertically slidable prismatic bar 9, this latter being lowerly provided with a tyre mounting/removal tool 10.

Within said column 3 there is housed, and conveniently locked, a double-acting pneumatic cylinder-piston unit 11 provided, according to the invention, for operating both the self-centering unit 2 and the bead release tool. It should be noted that said arrangement maintains the cylinder-piston unit 11 protected.

As is well illustrated in FIG. 1, said tool 12 is positioned at the end of a profiled arm 13, the opposite end of which is pivoted to the right side of the frame on a vertical axis 14.

Between said arm 13 and said frame 1 there is interposed a tension spring 15 provided to maintain the arm 13 close to the frame 1 when the bead release tool 12 is not in use.

This latter is provided with a lever 16 by which the tool 12 can be pulled away from the frame 1 against the action of the spring 15, and correctly positioned relative to the bead of a wheel (not shown) resting in an upright position against the frame 1.

In addition, to an intermediate point 17 of said arm 13 there is connected the end of a flexible fillform element 18, for example in the form of a metal cable, which extends into the frame 1 via a convenient slot (not shown) provided therein.

The opposite end of said flexible element 18 is fixed to a pulley 19 (see FIGS. 1, 2A) described hereinafter.

For reasons of simplicity, in FIG. 1 the flexible element 18 is shown taut when the arm 13 is close to the frame 1. In reality, when the arm 13 is in said position the flexible element 18 is slack, in order to enable the bead release tool 12 to be withdrawn from the frame 1. At this point it should be noted that in FIG. 1 the elements associated with the shaft 6 are shown grouped at the centre thereof for reasons of clarity, the effective arrangement of said elements being shown in FIGS. 2A and 2B.

Figure 2A:
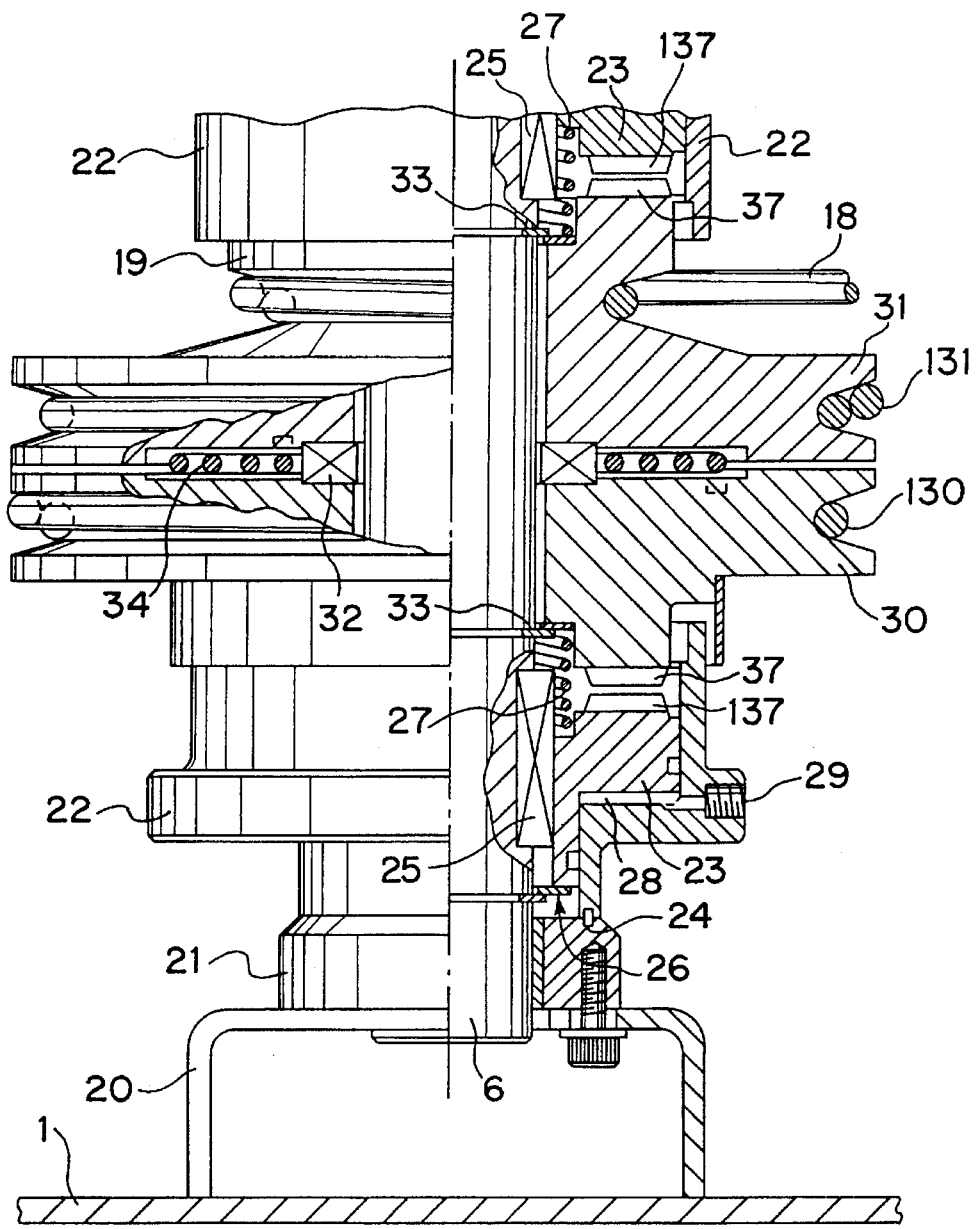
FIGS. 2A and 2B show respectively, to an enlarged scale, the upper and lower parts of the section taken on the line II—II of FIG. 1.

As can be seen in FIGS. 1 and 2A, on the bottom of the interior of the frame 1 there is fixed a cross-member 20 having a central support 21 in which the lower end of the shaft 6 is rotatably mounted.

Against said support 21 there rests a cylindrical body 22 of different cross-sections, within which a piston 23 of different cross-sections is slidingly mounted in a sealed manner.

The body 22 is torsionally constrained to the support 21 by a pin 24, the piston 23 being torsionally constrained to the shaft 6 by a key 25.

The piston 23 lies between a pair of lower stop rings 26 and an opposing repositioning spring 27, there being defined between said piston 23 and said body 22 an annular chamber 28.

This latter communicates with a port 29 to be connected to a compressed air source by way of valve means controlled by a pedal indicated in FIG. 1 by 51. The cylinder-piston unit 11 is simultaneously connected to said compressed air source by said valve means.

Again with reference to FIG. 2A it can be seen that two idle pulleys indicated respectively by 30 and 31 are mounted on the shaft 6, above the piston 23.

Between these pulleys there is interposed a spacer ring 32, the entire assembly being locked axially by two opposing circlips.

In addition, the two pulleys 30 and 31 are connected together by a torsion spring 34. Specifically, said torsion spring 34 is of the type wound as a flat spiral, this latter being housed in respective recesses provided in the frontal faces of the pulleys 30 and 31 (FIG. 2A).

Onto these latter there are fixed, and wound through at least one complete turn in the two opposing directions, the ends of two flexible elements 130 and 131 respectively, for example consisting of metal cables.

The opposite ends of said two elements 130 and 131 are connected to a common control cable 35 which, after deviating about a pulley 36 of horizontal axis (see FIG. 1), is connected to the rod 112 of the cylinder-piston unit 11.

In the upper part of the pulley 31 a lesser-diameter groove is provided (FIG. 2A), to define the pulley 19 for the winding/unwinding of the flexible element 18 which controls the rotatable arm 13 (FIG. 1).

According to the invention, respective frontal clutches are provided to torsionally constrain the shaft 6 to one or the other of said pair of pulleys 30 and 31.

As said two frontal clutches are specularly identical, these clutches and their relative engagement/disengagement means are indicated by the same reference numerals for reasons of simplicity.

Each clutch comprises a toothing provided on the lower transverse annular face of the pulley 30 and on the upper transverse annular face of the pulley 19 respectively, and a conjugate toothing 137 provided on the facing face of the corresponding piston 23 (FIG. 2A).

Figure 2B:
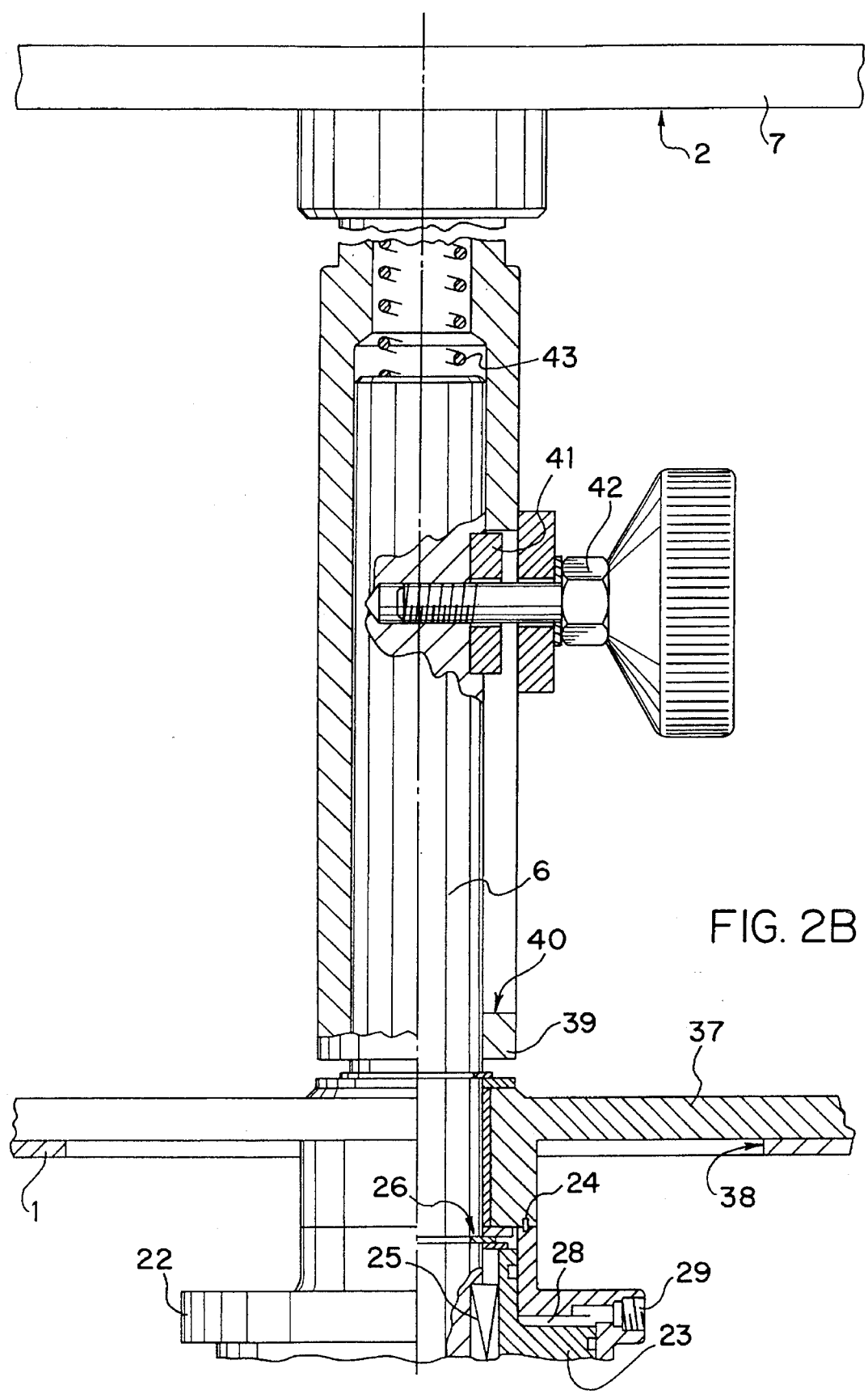

As in the preceding case, the upper piston 23 is torsionally constrained to the shaft 6 and is slidingly mounted in a sealed manner within the cylindrical body 22, with which it defines an annular chamber 28 (FIG. 2B).

Into this latter there opens a port 29 to be connected to a compressed air source via suitable valve means under the control of a pedal 52 (FIG. 1).

The cylinder-piston unit 11 is simultaneously connected to said compressed air source by said valve means.

A further pedal 53 (FIG. 1) is provided for connecting only the cylinder-piston unit 11 to said compressed air source.

With reference to FIG. 2B, it can be seen that above the upper cylindrical body 22 there is a flanged support 27 within which the shaft 6 is rotatably mounted and axially locked.

The support 37 is fixed to the upper wall of the frame 1 where a circular aperture 38 is provided to enable the shaft 6 together with all its accessories to be inserted/extracted.

A sleeve 39 is mounted as an exact but freely slidable fit on that part of the shaft 6 passing beyond the frame 1 and has its top fixed to the centre of the circular plate 7 of the self-centering unit 2.

In the sleeve 39 there is provided a longitudinal slot 40 in which there is inserted a key 41, this being centrally holed to allow passage of a screw clamp 42 for locking/releasing the sleeve 39.

Finally the interior of the sleeve 39 houses a compression spring 43 compressed between the upper end of the shaft 6 and the circular plate 7, to act as a counterweight for the self-centering unit 2.

The invention operates in the following manner.

At the commencement of operations, the piston 113 of the cylinder-piston unit 11 is completely lowered, the tool 12 is in the position shown in FIG. 1, and the clutches associated with the pulleys 30 and 31 are disengaged (FIG. 2A).

For a bead release operation the tool 12 is positioned against the bead to be released, after which the pedal 53 is operated.

By this means compressed air is fed into the lower chamber 110 of the cylinder-piston unit 11, and the opposing chamber 111 is put to discharge.

Consequently the flexible elements 130 and 131 are unwound from their respective pulleys 30 and 31, which are free to rotate about the shaft 6, and the element 18 is wound onto the pulley 19, with simultaneous pulling of the bead release tool 12.

When bead release is complete, the pedal 53 is operated to reverse the travel of the piston 113, the spring 34 rewinding the flexible elements 130 and 131 and winding the flexible element 18.

For mounting and removing a tyre, rotation of the self-centering unit 2 in one direction and the other is controlled by the pedals 51 and 52 in the manner apparent from the aforegoing.

Specifically, for this purpose one of said two pulleys 130 and 131 is made rigid with the shaft 6 by the respective clutch 37/137, the other pulley being free to rotate about the shaft in the opposite direction to the preceding.

On termination of these operations the previously engaged clutch is disengaged, the piston 113 slides dowrywards and the spring 34 rotates the pulleys 30 and 31 (at that moment both idle) to take up those parts of the flexible elements 130 and 131 which have been previously unwound.

The merits and advantages of the invention are apparent from the aforegoing and from an examination of the accompanying Figures.

The invention is not limited to that illustrated and described, but also includes all technical equivalents of the stated means and their combinations.

Thus for example, the pulley 19 can be separate from the pulley 31 and be rotatably mounted on the shaft 6 in combination with clutch means of the described type.

The same results are obtained if the pulley 19 is excluded and the arm 13 is operated by a respective double-acting pneumatic cylinder-piston unit.

I claim:

1. A tyre removal machine comprising a frame (1) which contains a rotatable vertical shaft (6) carrying a self-centering unit (2), and is provided with a rear column (3) for supporting a tyre mounting/removal tool (10), and a rotatable arm (13) for supporting a bead release tool (12), comprising at least one flexible element (35) which at one end is connected to the rod (112) of a double-acting pneumatic cylinder-piston unit (11), its other end forking into two branches (130, 131) which wind in opposing directions about two coaxial pulleys (30, 31) which are idly mounted on said shaft (6) and are associated with respective coupling devices for making said coaxial pulleys selectively rigid with said shaft (6), and means (34) to cause said coaxial pulleys to rotate in order to rewind said branches (130, 131).

2. A machine according to claim 1, wherein said double-acting pneumatic cylinder-piston unit (11) is housed and fixed within said column (3).

3. A machine according to claim 1, and comprising a further flexible element (18) having one end connected to said rotatable arm (13) and its other end wound about a further pulley (19) coaxial with said two coaxial pulleys.

4. A machine according to claim 1 wherein each of said flexible element and the further flexible element (18) consist of a metal cable (35) and wherein said flexible element is provided with a deviation pulley (36) able to guide the same during its winding and unwinding.

5. A machine according to claim 1, wherein said coupling devices comprise frontal clutches.

6. A machine according to claim 5, wherein said frontal clutches each comprise two mutually facing conjugate toothings (37) and (137), of which the first (37) is provided on a lateral face of the respective pulley (30) or (31), and the second (137) is provided at the end of a piston (23) which is torsionally constrained to said shaft (6) and is slidingly mounted within a cylindrical body (22), with which it forms a chamber (28) to be connected to a source of compressed air.

7. A machine according to claim 1, wherein said means (34) for causing said coaxial pulleys to rotate in order to rewind said branches comprises a torsion spring wound as a flat spiral, which lies between said two pulleys (30), (31) and has its ends connected to the same two pulleys.

8. A machine according to claim 3, wherein said further pulley (19) is rigid with one (31) of said two coaxial pulleys (30), (31).

9. A machine according to claim 1, wherein said frame (1) comprises a horizontal bearing base and a horizontal upper wall which lies below said self-centering unit (2), wherein said vertical shaft (6) is rotatably mounted on the frame (1) between a first support (20) which is provided on said bearing base of the frame (1) and a second support (37) which is provided on said upper wall of the frame (1), said upper wall having an aperture (38) to enable the shaft (6) with its relative accessories applied thereto to pass through said aperture (38).

10. A machine according to claim 1, wherein between said shaft (6) and said self-centering unit (2) there are interposed means to enable the height of said self-centering unit (2) to be adjusted.

11. A machine according to claim 10, wherein said means to enable the height of said self-centering unit (2) to be adjusted comprise a descending sleeve (39) which is fixed to the centre of the self-centering unit (2), is torsionally but not axially fixed to said shaft (6), and is provided with a locking/unlocking device (42).

12. A machine according to claim 11, wherein within said sleeve (39) there is housed a compression spring (43) compressed between the top of the shaft (6) and the self-centering unit (2).

13. A machine according to claim 1, wherein a return spring (15) is stretched between said frame (1) and said rotatable arm (13).

14. A machine according to claim 3, wherein each of said flexible element (35) and the further flexible element (18) consist of a metal cable, (35) and wherein said flexible element is provided with a deviation pulley (36) able to guide the same during its winding and unwinding.

15. A machine according to claim 5, wherein said frame (1) comprises a horizontal bearing base and a horizontal upper wall which lies below said self-centering unit (2), wherein said vertical shaft (6) is rotatably mounted on the frame (1) between a first support (20) which is provided on said bearing base of the frame (1) and a second support (37) which is provided on said upper wall of the frame (1), said upper wall having an aperture (38) to enable the shaft (6) with its relative accessories applied thereto to pass through said aperture (38).

16. A machine according to claim 6, wherein said frame (1) comprises a horizontal bearing base and a horizontal upper wall which lies below said self-centering unit (2), wherein said vertical shaft (6) is rotatably mounted on the frame (1) between a first support (20) which is provided on said bearing base of the frame (1) and a second support (37) which is provided on said upper wall of the frame (1), said upper wall having an aperture (38) to enable the shaft (6) with its relative accessories applied thereto to pass through said aperture (38).

17. A machine according to claim 7, wherein said frame (1) comprises a horizontal bearing base and a horizontal upper wall which lies below said self-centering unit (2), wherein said vertical shaft (6) is rotatably mounted on the frame (1) between a first support (20) which is provided on said bearing base of the frame (1) and a second support (37) which is provided on said upper wall of the frame (1), said upper wall having an aperture (38) to enable the shaft (6) with its relative accessories applied thereto to pass through said aperture (38).

18. A machine according to claim 8, wherein said frame (1) comprises a horizontal bearing base and a horizontal upper wall which lies below said self-centering unit (2), wherein said vertical shaft (6) is rotatably mounted on the frame (1) between a first support (20) which is provided on said bearing base of the frame (1) and a second support (37) which is provided on said upper wall of the frame (1), said upper wall having an aperture (38) to enable the shaft (6) with its relative accessories applied thereto to pass through said aperture (38).

* * * * *